United States Patent [19]
Biesmans et al.

[11] Patent Number: 6,063,826
[45] Date of Patent: May 16, 2000

[54] POLYISOCYANATE BASED XEROGELS

[75] Inventors: Guy Leon Jean Ghislain Biesmans, Everberg; Andy Mertens, St.-Steves-Woluwe; Els Kinnaes, Blanden, all of Belgium

[73] Assignee: Imperial Chemical Industries PLC, London, United Kingdom

[21] Appl. No.: 09/052,194

[22] Filed: Mar. 31, 1998

[30] Foreign Application Priority Data

Apr. 1, 1997 [EP] European Pat. Off. .............. 97105360

[51] Int. Cl.$^7$ ........................... C08G 18/84; C08G 18/00
[52] U.S. Cl. ......................... 521/158; 521/146; 521/149; 521/155; 521/182; 521/183
[58] Field of Search ..................................... 521/146, 149, 521/155, 158, 182, 183

[56] References Cited

U.S. PATENT DOCUMENTS

| | | |
|---|---|---|
| 5,420,168 | 5/1995 | Mayer et al. . |
| 5,476,878 | 12/1995 | Pekala . |
| 5,478,867 | 12/1995 | Tabor . |

FOREIGN PATENT DOCUMENTS

| | | |
|---|---|---|
| 19505046 | 8/1996 | Germany . |
| 95/02009 | 1/1995 | WIPO . |
| 95/03358 | 2/1995 | WIPO . |
| 96/20822 | 7/1996 | WIPO . |
| 96/36654 | 11/1996 | WIPO . |
| 96/37539 | 11/1996 | WIPO . |

*Primary Examiner*—Morton Foelak
*Attorney, Agent, or Firm*—Pillsbury Madison & Sutro

[57] ABSTRACT

Process for making polyisocyanate based xerogels by trimerisation of an organic polyisocyanate in an organic solvent in the presence of a (co)polymer containing an isocyanate-reactive group, gellation and drying of the obtained sol-gel.

18 Claims, No Drawings

POLYISOCYANATE BASED XEROGELS

The present invention relates to polyisocyanate based xerogels and to methods for their preparation.

Xerogels based on polyisocyanate chemistry are desired in DE 19505046. They are prepared by mixing a polyisocyanate and a trimerisation catalyst in a suitable solvent and maintaining said mixture in a quiescent state for a sufficiently long period of time to form a polymeric gel and subsequently removing the solvent from the gel by means of evaporative drying.

Densities of the obtained xerogels are rather high caused by volume shrinkage during drying. Further drying times are long.

Therefore it is an object of the present invention to provide a method for preparing polyisocyanate-based organic xerogels of lower density, reduced shrinkage with retention of a twodimensional shape and having a fast drying time.

Accordingly, the present invention provides a method for preparing a polyisocyanate based organic xerogel comprising the steps of a) mixing an organic polyisocyanate and an isocyanate trimerisation catalyst in a suitable solvent, b) maintaining said mixture in quiescent state for a sufficiently long period of time to form a polymeric gel, and c) drying the obtained gel, wherein a (co)polymer containing at least one isocyanate-reactive group is mixed with the other ingredients in step a).

The isocyanate-reactive group present in the co(polymer) is an OH, COOH, $NH_2$ or NHR group, preferably an OH group.

Examples of suitable classes of (co)polymers for use in the present invention are polyacrylates, polystyrenics, polyketones, bisphenol A resins, hydrocarbon resins, polyesters, polyaldehyde-ketone resins, resols, novolaks, neutral phenolic resins, polymethacrylates, polyacrylonitrile, polyvinylacetate, PET derivatives, polyamides, cellulose, polyethers, modified polyethylene and polypropylene, polybutadienes and alkyd resins.

A particularly preferred class of (co)polymers are those derived from ethylenically unsaturated monomers; preferred are styrene, acrylic acid and acrylic acid ester derivatives such as methylacrylate esters, hydroxyacrylate esters and partially fluorinated acrylate esters.

Another preferred class of (co)polymers are those obtained by condensation of aldehydes (preferably formaldehyde) and/or ketones such as phenolic resins, particularly neutral phenolic resins, polyaldehyde-ketone resins, polyketones, novolaks, and resols.

Preferably the (co)polymer for use in the present invention has an OH value of between 30 and 800 mg KOH/g, preferably between 100 and 500 mg KOH/g and a glass transitior temperature of between −50 and 150° C., preferably between 0 and 80° C. The molecular weight of the (co)polymer is preferably between 500 and 10000, more preferably between 4000 and 6000. The (co)polymer has preferably a melt range of 60 to 160° C.

Optimal results are generally obtained when the aromaticity of the (co)polymer is at least 15%; the aromaticity being calculated as 7200×number of aromatic moieties in the polymer/number average molecular weight.

Preferred (co)polymers for use in the present invention are copolymers of styrene and hydroxyacrylate and optionally also acrylate.

Such copolymers are commercially available, for example, Reactol 180, Reactol 255 and Reactol 100 (all available from Lawter International). Other preferred (co) polymers which are commercially available from Lawter International are K 1717 (a polyketone), Biresol (a bisphenol A resin), K 2090 (a polyester), K 1717B (an aldehyde-keton resin) and K 1111 (a neutral phenolic resin).

The (co)polymers are used in the present process preferably in such an amount that the ratio between functional groups in the polyisocyanate (NCO) and in the (co)polymer (OH) is between 1:1 and 10:1, preferably between 3:1 and 7:1.

By using the above (co)polymers in the preparation process xerogels of lower density are obtained.

Densities of the xerogels obtained by using the process of the present invention are generally in the range 1 to 1000 $kg/m^3$, more generally in the range 10 to 800 $kg/m^3$ and even more generally in the range 20 to 400 $kg/m^3$ or even 100 to 300 $kg/m^3$.

The xerogels prepared according to the process of the present invention consist of agglomerated particles of diameter 0.1 to 10 $\mu$m, generally 1 to 3 $\mu$m.

Surface areas of the xerogels prepared according to the process of the present invention are generally in the range 1 to 500 $m^2/g$, more generally in the range 5 to 100 $m^2/g$.

Polyisocyanates for use in the present method for preparing the polyisocyanate-based xerogels include aliphatic, cycloaliphatic, araliphatic and aromatic polyisocyanates known in the literature for use generally in the production of polyurethane/polyisocyanurate materials. of particular importance are aromatic polyisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues).

The polyisocyanate is used in amounts ranging from 0.5 to 30% by weight, preferably from 1.5 to 20% by weight and more preferably from 3 to 15% by weight based on the total reaction mixture.

Trimerisation catalysts for use in the present preparation method include any isocyanate trimerisation catalyst known in the art such as quaternary ammonium hydroxides, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Triazine derivatives, quaternary ammonium salts and potassium carboxylates are preferred. Specific preferred trimerisation catalysts for use in the present method are Polycat 41 available from Abbott Laboratories, DABCO TMR, TMR-2, TMR-4 and T 45 available from Air Products, potassium octanoate and potassium hexanoate.

In addition to the trimerisation catalyst a urethane catalyst as known in the art may be used.

The polyisocyanate/catalyst weight ratio varies between 5 and 1000, preferably between 5 and 500, most preferably between 10 and 80. The preferred polyisocyanate/catalyst weight ratio depends on the amount of polyisocyanate used, the reaction/cure temperature, the solvent used, additives used.

The solvent to be used in the preparation method according to the present invention should be a solvent for the (co)polymer, catalyst and monomeric (non-reacted) polyisocyanate as well as for the polymeric (reacted) polyisocyanate. The solvent power should be such as to form a homogeneous solution of non-reacted compounds and to dissolve the reaction product or at least prevent flocculation of the reaction product. Solvents with a δsolubility parameter between 0 and 25 MPa$^{1/2}$ and a hydrogen bonding parameter $\delta_H$, between 0 and 15 MPa$^{1/2}$ are most suitable. Preferably volatile solvents are used having a boiling point at room temperature of below 150° C.

Suitable solvents for use in the method according to the present invention include hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as ethane, propane, n-butane, isobutane, n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone, cyciohexanone, methyl t-butyl ketone and methyl ethyl ketone.

Suitable alkyl alkanoates which may be used as solvent include methyl formate, methyl acetate, ethyl formate, butylacetate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane and its isomers, tetrafluoropropane and its isomers and pentafluoropropane and its isomers. Substantially fluorinated or perfluorinated (cyclo)alkanes having 2 to 10 carbon atoms can also be used.

Suitable hydrochlorofluorocarbons which may be used as solvent include chlorodifluoromethane, 1,1-dichloro-2,2,2-trifluoroethane, 1,1-dichloro1-fluoroethane, 1-chloro-1,1-dlfluoroethane, 1-chloro-2-fluoroethane and 1,1,1,2-tetrafluoro-2-chloroethane.

Suitable chlorofluorocarbons which may be used as solvent include trichlorofluoromethane, dichiorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene.

Suitable fluorine-containing ethers which may be used as solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Preferred solvents for use in the method according to the present invention are acetone, cyclohexanone, methyl ethyl ketone, methyl t-butyl ketone and butylacetate.

The polyisocyanate, the (co)polymer, the catalyst and the solvent are mixed by simply shaking the reaction vessel or by slowly stirring the mixture or via impigment mxing, in-line static mixers or continuous lay-down in shaping moulds. Alternatively the polyisocyanate, the (co)polymer and the solvent are first mixed and subsequently the catalyst is added hereto. Some catalyst may also be added after the gelling for enhancing post-cure. Mixing can be done at room temperature or at somewhat higher temperatures.

The solids content of the reaction mixture is preferably between 2 and 30% by weight, more preferably between 5 and 20% by weight. By using the above specified (co)polymers in the process for making xerogels higher solid contents can be used, yet Leading to lower density xerogels having less volume shrinkage, fast drying maintaining two-dimensional shape.

Thereafter the mixture is left standing for a certain period of time to form a polymeric gel. This time period varies from 5 seconds to several weeks depending on the system and the targeted void size and density. Temperatures in the range of from about –50° C. to about 50° C., preferably 0 to 45° C. may be employed.

Although the mixture gels within a few hours, it has been found to be advantageous to cure the gels for a minimum of 24 hours so as to obtain a solid gel that can be easily handled in subsequent processing. A postcure cycle at elevated temperatures can be included.

The solvent is removed from the obtained gel either by air-drying (evaporative drying) (cold or hot air), drying under vacuum (for example, in an oven or on a buchner), by microwave drying, radiofrequency drying, sublimation, freeze drying or any combination of the aforementioned methods. The drying step can take from 10 minutes to a few days but is generally less than 6 hours.

During drying the xerogel can be formed into a suitable shape by applying mechanical pressure to the drying gel.

In order to further improve the structural integrity and the handling of the xerogels a reinforcement material can be incorporated in the sol-gel process, preferably in an amount of between 0.05 and 30% by weight on polymer. Examples of suitable reinforcement materials include glass fibre, glass mat, felt, glass wool, carbon fibre, boron fibre, ceramic fibre, rayon fibre, nylon fibre, olefin fibre, alumina fibre, asbestos fibre, zirconia fibre, alumina, clay, mica, silicas, calcium carbonate, talc, zinc oxide, barium sulfates, wood and shell floor, polystyrene, Tyvec (available from Dupont).

Further suitable additives to be used in the process of the present invention and further suitable processing methods are described in WO 95/03358, WO 96/36654 and WO 96/37539, all incorporated herein by reference.

The obtained xerogels can be used for thermal insulation as in construction or appliances and/or sound insulation applications.

The present invention is illustrated but not limited by the following examples in which the following ingredients were used:

Reactol 180: a (hydroxy)acrylate/styrene copolymer of OH value 180 mg KOH/g, available from Lawter International.

K 1717: a polyketone resin of OH value 270 mg KOH/g, available from Lawter International.

K 2090: a polyester resin of OH value 320 mg KOH/g, available from Lawter International.

SUPRASEC X2185: a polymeric isocyanate available from Imperial Chemical Industries.

SUPRASEC DNR: a polymeric isocyanate available from Imperial Chemical Industries.

Dabco TMR: a trimerisation catalyst available from Air Products.

Polycat 41: a trimerisation catalyst available from Air Products. acetone: Rathburn-glass distilled grade.

SUPRASEC is a trademark of Imperial Chemical Industries.

EXAMPLE 1

In a recipient, 4.74 grams of Reactol 180 were dissolved in 208.7 grams of acetone. To this mixture 6.26 grams of SUPRASEC X2185 were blended until a homogeneous solution was obtained. To this solution 0.313 mis of Dabco TMR were injected by means of a syringe. The recipient was closed air-tight and shaken thoroughly to ensure a good distribution of the catalyst through the liquid.

The solution was then isolated at ambient conditions for 1 to allow the formation of a sol gel.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours in a vacuum oven at 90° C. to allow the evaporation of residual amounts of acetone. The obtained xerogel monolith has the following properties: density 303 kg/m$^3$, surface area 11 m$^2$/g, lambda initial 11 mW/mK, lambda air 32 mW/mK, critical pressure 20 mBar.

Density (envelope density) was measured on a Micromeretics Geopyc 1360. Surface area was measured on a Micromeretics Gemini (BET N$_2$ adsorption). Lambda was measured according to standard ASTM C519; Lambda initial at a pressure of below 0.1 mbar, Lambda air at atmospheric pressure.

Critical pressure is the pressure at which the Lambda/log pressure curve deviates from a flat line.

EXAMPLE 2

In a recipient, 3.44 grams of Reactol 180 were dissolved in 208.6 grams of acetone. To this mixture 7.56 grams of SUPRASEC X2185 were blended until a homogeneous solution was obtained. To this solution 0.378 mls of Dabco TMR were injected by means of a syringe. The recipient was closed air-tight and shaken thoroughly to ensure a good distribution of the catalyst through the liquid.

The solution was then isolated at ambient conditions and gelled in 25 minutes.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours in a vacuum oven at 90° C. to allow the evaporation of residual amounts of acetone. The obtained xerogel has the following properties: density 109 kg/m$^3$, surface area 5 m$^2$/g, lambda initial 5 mW/mK, lambda air 38 mW/mK, critical pressure 2 mBar.

EXAMPLE 3

In a recipient, 6.63 grams of Reactol 180 were dissolved in 204.4 grams of acetone. To this mixture 8.77 grams of SUPRASEC X2185 were blended until a homogeneous solution was obtained. To this solution 0.219 mls of Dabco TMR were injected by means of a syringe. The recipient was closed air-tight and shaken thoroughly to ensure a good distribution of the catalyst through the liquid.

The solution was then isolated at ambient conditions for 20 minutes to allow the formation of a sol gel.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours into a vacuum oven at 90° C. to allow the evaporation of residual amounts of acetone.

The obtained xerogel has the following properties: density 256 kg/m$^3$, surface area 26 m$^2$/g, lambda initial 16 mW/mK, lambda air 32 mW/mK, critical pressure 30 mBar.

EXAMPLE 4

In a recipient, 4.81 grams of Reactol 180 were dissolved in 204.3 grams of acetone. To this mixture 10.6 grams of SUPRASEC X2185 were blended until a homogeneous solution was obtained. To this solution 0.265 mls of Dabco TMR were injected by means of a syringe. The recipient was closed air-tight and shaken thoroughly to ensure a good distribution of the catalyst through the liquid.

The solution was then isolated at ambient conditions for 10 minutes to allow the formation of a sol gel.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours into a vacuum oven at 90° C. to allow the evaporation of residual amounts of acetone.

The obtained xerogel has the following properties: density 174 kg/m$^3$, surface area 9 m$^2$/g, lambda initial 7 mW/mK, lambda air 31 mW/mK, critical pressure 8 mBar.

EXAMPLE 5

In a recipient, 3.77 grams of Reactol 180 were dissolved in 204.3 grams of acetone. To this mixture 11.63 grams of SUPRASEC X2185 were blended until a homogeneous solution was obtained. To this solution 0.291 mls of Dabco TMR were infected by means of a syringe. The recipient was closed air tight and shaken thoroughly to ensure a good distribution. of the catalyst through the liquid.

The solution was then isolated at ambient conditions for 5 minutes to allow the formation of a sol gel.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours into a vacuum oven at 90° C. to allow the evaporation of residual amounts of acetone.

The obtained xerogel has the following properties: density 94 kg/m$^3$, surface area 6 m$^2$/g, lambda initial 5 mW/mK, lambda air 37 mW/mK, critical pressure 2 mBar.

EXAMPLE 6

In a recipient, 13.55 grams of Reactol 180 were dissolved in 197.8 grams of acetone. To this mixture 8.45 grams of SUPRASEC X2185 were blended until a homogeneous solution was obtained. To this solution 0.169 mls of Dabco TMR were injected by means of a syringe. The recipient was closed air tight and shaken thoroughly to ensure a good distribution of the catalyst through the liquid.

The solution was then isolated at ambient conditions for 20 minutes to allow the formation of a sol gel.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours into a vacuum oven at 90° C. to allow the evaporation of residual amounts of acetone.

EXAMPLE 7

In a recipient, 7.66 grams of Reactol 180 were dissolved in 197.7 grams of acetone. To this mixture 14.33 grams of SUPRASEC X2185 were blended until a homogeneous solution was obtained. To this solution 0.287 mls of Dabco TMR were injected by means of a syringe. The recipient was closed air-tight and shaken thoroughly to ensure a good distribution of the catalyst through the liquid.

The solution was then isolated at ambient conditions for 10 minutes to allow the formation of a sol gel.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours into a vacuum oven at 90° C. to allow the evaporation of residual amounts of acetone.

The obtained xerogel has the following properties: density 249 kg/m$^3$, surface area 49 m$^2$/g, lambda initial 25 mW/mK, lambda air 33 mW/mK, critical pressure 30 mBar.

EXAMPLE 8

In a recipient, 5.34 grams of Reactol 180 were dissolved in 197.7 grams of acetone. To this mixture 16.66 grams of SUPRASEC X2185 were blended until a homogeneous solution was obtained. To this solution 0.333 mls of Dabco TMR were injected by means of a syringe. The recipient was closed air-tight and shaken thoroughly to ensure a good distribution of the catalyst through the liquid.

The solution was then isolated at ambient conditions for less than 5 minutes to allow the formation of a sol gel.

Once the reaction was completed the sol gel was removed from its recipient and brought under ambient atmosphere. This allowed a spontaneous evaporation of the acetone into the air. This process took 1 day for a 3.5 cm thick sample. The dried specimen was then treated for four hours into a vacuum oven at 90° C. to allow the evaporation of residual amounts of acetone.

The obtained xerogel has the following properties: density 197 kg/m$^3$, surface area 9 m$^2$/g, lambda initial 6 mW/mK, lambda air 31 mW/mK, critical pressure 8 mbar.

COMPARATIVE EXAMPLE 9

In a recipient, 135 grams of acetone were blended with 15 grams of SUPRASEC X2185 until a homogeneous solution was obtained. To this solution 0.3 mls of Dabco TMR were injected by means of a syringe. The recipient was closed air-tight and shaken thoroughly to ensure a good distribution of the catalyst through the liquid.

The solution was then isolated at ambient conditions for 24 hours to allow the formation of a sol gel.

Once the reaction was completed the sol gel was removed from its recipient and brought under ambient atmosphere. This allowed a spontaneous evaporation of the acetone into the air. This process took about 1 day. The dried specimen was then treated for four hours into a vacuum oven at 90° C. to allow the evaporation of residual amounts of acetone. The air cried xerogel has a density of 178 kg/m$^3$, surface area 3 m$^2$/g, lambda initial 5 mW/mK, lambda air 35 mW/mK, critical pressure 2 mbar.

COMPARATIVE EXAMPLE 10

In 93 grams of acetone 7 grams of SUPRASEC X2185 were dissolved. To this solution 0.175 g of Dabco TMR were added.

The polymer started to flocculated and no monolithical sol-gel could be obtained.

COMPARATIVE EXAMPLE 11

In 95 g of acetone 5 g of SUPRASEC X2185 were dissolved. To this solution 5 g of Dabco TMP were added.

The reaction mixture precipitated out and no sol-gel was formed.

EXAMPLE 12

Example 2 was repeated.

After the formation of the sol-gel the monolith sol-gel was put onto a buchner filter. The solvent was removed under moderate vacuum for 1 hour for a 3.5 cm thick sample.

The resulting monolith had the following properties: density 170 kg/m$^3$, lambda in Dial 4 mW/mK, lambda air 29 mW/mK, critical pressure 3 mbar.

EXAMPLE 13

A reaction mixture containing 8.8 g of SUPRASEC X2185, 155 g of acetone, 2.86 g of Reactol R180, 0.22 g of Dabco TMR and glasswoll (0.5 wt % of solids) was formed into a sol-gel and subsequently air-dried.

The density of the obtained xerogel was 220 kg/m$^3$.

EXAMPLE 14

A catalyst solution was prepared by blending subsequently 0.271 ml of Polycat 41 and 0.271 ml of Dabco TMR in 22.96 g of acetone (technical grade). The addition of the catalysts was done via a micrometer syringe. A second solution was prepared in two steps. First 2.93 g of the polyketone resin K1717 was dissolved In 70.0 g of acetone (technical grade and subsequently 13.57 g of SUPRASEC DNR was added. Both solutions were mixed thoroughly for a very short time (a few seconds) before they were blended together.

The obtained mixture was then left to stand for gelation and curing for 24 hours at room temperature.

The obtained sol gel was removed from its recipient and dried through a natural evaporation process.

A xerogel with a density of 181 kg/m$^3$ was obtained.

EXAMPLE 15

A catalyst solution was prepared by blending subsequently 0.326 ml of Polycat 41 and 0.326 ml of Dabco TMR in 23.95 g of acetone (technical grade). The addition of the catalysts was done via a micrometer syringe. A second solution was prepared in two steps. First 2.37 g of the polyester resin K2090 was dissolved in 70.0 g of acetone (technical grade) and subsequently 13.03 g of SUPRASEC DNR was added. Both solutions were mixed thoroughly for a very short time (a few seconds) before they were blended together.

The obtained mixture was then left to stand for gelation and curing for 24 hours at room temperature.

The obtained sol gel was removed from its recipient and dried through a natural evaporation process.

A xerogel with a density of 155 $kgm^3$ was obtained.

We claim:

1. Method for preparing a polyisocyanate-based xerogel comprising the steps of
   a) mixing an organic polyisocyanate, an isocyanate trimerisastion catalyst and a (co)polymer containing at least one isocyanate reactive group in a suitable solvent,
   b) maintaining said mixture in a quiescent state for a sufficiently long period of time to form a polymeric gel, and
   c) drying the obtained gel, characterised in that said (co)polymer is derived from ethylenically unsaturated monomers or is obtained by condensation of aldehydes and/or ketones.

2. Method according to claim 1 wherein the isocyanate-reactive group is OH.

3. Method according to claim 1 wherein said monomers are selected from the group consisting of styrene, acrylic acid ester and hydroxyacrylic acid ester.

4. Method according to claim 1 wherein said (co)polymer is selected from the group consisting of phenolic resins, polyaldehyde-keton resins, polyketones, novolaks and resols.

5. Method according to claim 1 wherein the (co)polymer is used in an amount such that the ratio between the functional groups in the polylsocyanate and the functional groups in the (co)polymer is between 1:1 and 10:1.

6. Method according to claim 1 wherein the density of the xerogel is between 100 and 300 $kg/m^3$.

7. Method according to claim 1 wherein the organic polyisocyanate is diphenylmethane diisocyanate or polymethylene polyphenylene polyisocyanate.

8. Method according to claim 1 wherein the organic polyisocyanate is used in amounts ranging from 1.5 to 20% by weight based on the total reaction mixture.

9. Method according to claim 1 wherein the polyisocyanate trimerisation catalyst is a triazine derivative or a quaternary ammonium salt or a potassium carboxylate.

10. Method according to claim 1 wherein the polyisocyanate/catalyst weight ratio is between 10 and 80.

11. Method according to claim 1 wherein the solvent is acetone.

12. Method according to claim 1 wherein the solids content of the reaction mixture is between 5 and 20% by weight.

13. Method according to claim 1 wherein mechanical pressure is applied to the gel during the drying step c).

14. Method according to claim 1 wherein the drying step c) takes less than 6 hours.

15. Method according to claim 1 wherein the drying step c) involves vacuum drainage and/or evaporative drying.

16. Method according to claim 1 wherein a reinforcement material is incorporated in the sol-gel process.

17. Polyisocyanate-based xerogel obtainable by the method as defined in claim 1.

18. A method of using a xerogel as defined in claim 17 said method comprising forming thermal insulation and/or sound insulation from said xerogel.

* * * * *